US008620523B2

(12) United States Patent
Nelson et al.

(10) Patent No.: US 8,620,523 B2
(45) Date of Patent: Dec. 31, 2013

(54) REARVIEW ASSEMBLY WITH MULTIPLE AMBIENT LIGHT SENSORS

(75) Inventors: Barry K. Nelson, Howard City, MI (US); David J. Schmidt, Holland, MI (US); Neil J. Boehm, Allegan, MI (US)

(73) Assignee: Gentex Corporation, Zeeland, MI (US)

( * ) Notice: Subject to any disclaimer, the term of this patent is extended or adjusted under 35 U.S.C. 154(b) by 15 days.

(21) Appl. No.: 13/494,656

(22) Filed: Jun. 12, 2012

(65) Prior Publication Data

US 2012/0330504 A1 Dec. 27, 2012

Related U.S. Application Data

(60) Provisional application No. 61/501,024, filed on Jun. 24, 2011.

(51) Int. Cl.
*G06F 7/00* (2006.01)
*G02B 5/00* (2006.01)

(52) U.S. Cl.
USPC ............................................. 701/36; 359/843

(58) Field of Classification Search
USPC ............... 701/36, 49; 359/604, 838, 842–844
See application file for complete search history.

(56) References Cited

U.S. PATENT DOCUMENTS

| | | | |
|---|---|---|---|
| 2,632,040 | A | 3/1953 | Rabinow |
| 2,762,930 | A | 9/1956 | Onksen, Jr. et al. |
| 2,827,594 | A | 3/1958 | Rabinow |
| 3,260,849 | A | 7/1966 | Polye |
| 3,601,614 | A | 8/1971 | Platzer, Jr. |
| 3,680,951 | A | 8/1972 | Jordan et al. |
| 3,711,722 | A | 1/1973 | Kavanagh |
| 3,746,430 | A | 7/1973 | Brean et al. |
| 3,749,477 | A | 7/1973 | Willoughby et al. |
| 3,828,220 | A | 8/1974 | Moore et al. |
| 3,866,067 | A | 2/1975 | Amelio |

(Continued)

FOREIGN PATENT DOCUMENTS

| | | |
|---|---|---|
| DE | 2946561 | 5/1981 |
| DE | 19526249 | 2/1996 |

(Continued)

OTHER PUBLICATIONS

Patent Cooperation Treaty, International Searching Authority, International Search Report, Written Opinion of the International Searching Authority and Notification of Transmittal, Sep. 27, 2012, 7 Pages.

(Continued)

*Primary Examiner* — Mary Cheung
(74) *Attorney, Agent, or Firm* — Price Heneveld LLP; Scott P. Ryan

(57) ABSTRACT

A rearview assembly configured for use with a vehicle and method are provided, wherein the rearview assembly includes a first light sensor generally facing forward with respect to an forward driving orientation of the vehicle and configured to detect ambient light, a second light sensor generally facing forward with respect to a forward driving orientation of the vehicle and configured to detect ambient light, a rearview component configured to display an image rearward of the vehicle, and a processor communicatively connected to the first light sensor, the second light sensor, and the rearview component, wherein the processor is configured to control the rearview component based upon light detected by at least one of the first and second light sensors.

14 Claims, 4 Drawing Sheets

(56) References Cited

U.S. PATENT DOCUMENTS

| | | |
|---|---|---|
| 3,914,309 A | 10/1975 | Swensen |
| 4,023,368 A | 5/1977 | Kelly |
| 4,140,142 A | 2/1979 | Dormidontov et al. |
| 4,161,653 A | 7/1979 | Bedini et al. |
| 4,208,668 A | 6/1980 | Krimmel |
| 4,225,782 A | 9/1980 | Kuppenheimer et al. |
| 4,293,877 A | 10/1981 | Tsunekawa et al. |
| 4,315,159 A | 2/1982 | Niwa et al. |
| 4,355,271 A | 10/1982 | Noack |
| 4,443,057 A | 4/1984 | Bauer et al. |
| 4,465,370 A | 8/1984 | Yuasa et al. |
| 4,469,417 A | 9/1984 | Masunaga et al. |
| 4,475,036 A | 10/1984 | Bauer et al. |
| 4,547,676 A | 10/1985 | Suzuki et al. |
| 4,580,875 A | 4/1986 | Bechtel et al. |
| 4,603,946 A | 8/1986 | Kato et al. |
| 4,620,141 A | 10/1986 | McCumber et al. |
| 4,632,509 A | 12/1986 | Ohmi et al. |
| 4,652,745 A | 3/1987 | Zanardelli |
| 4,669,826 A | 6/1987 | Itoh et al. |
| 4,678,938 A | 7/1987 | Nakamura |
| 4,684,222 A | 8/1987 | Borrelli et al. |
| 4,690,508 A | 9/1987 | Jacob |
| 4,692,798 A | 9/1987 | Seko et al. |
| 4,697,883 A | 10/1987 | Suzuki et al. |
| 4,701,022 A | 10/1987 | Jacob |
| 4,770,514 A | 9/1988 | Silverglate |
| 4,793,690 A | 12/1988 | Gahan et al. |
| 4,798,956 A | 1/1989 | Hochstein |
| 4,799,768 A | 1/1989 | Gahan |
| 4,819,071 A | 4/1989 | Nakamura |
| 4,859,867 A | 8/1989 | Larson et al. |
| 4,862,037 A | 8/1989 | Farber et al. |
| 4,867,561 A | 9/1989 | Fuji et al. |
| 4,871,917 A | 10/1989 | O'Farrell et al. |
| 4,886,960 A | 12/1989 | Molyneux et al. |
| 4,891,559 A | 1/1990 | Matsumoto et al. |
| 4,902,108 A | 2/1990 | Byker |
| 4,916,307 A | 4/1990 | Nishibe et al. |
| 4,916,374 A | 4/1990 | Schierbeek et al. |
| 4,917,477 A | 4/1990 | Bechtel et al. |
| 4,930,742 A | 6/1990 | Schofield et al. |
| 4,956,591 A | 9/1990 | Schierbeek et al. |
| 4,960,996 A | 10/1990 | Hochstein |
| 4,967,319 A | 10/1990 | Seko |
| 4,973,844 A | 11/1990 | O'Farrell et al. |
| 4,987,354 A | 1/1991 | Steinmann |
| 5,036,437 A | 7/1991 | Macks |
| 5,105,207 A | 4/1992 | Nelson |
| 5,124,549 A | 6/1992 | Michaels et al. |
| 5,140,455 A | 8/1992 | Varaprasad et al. |
| 5,160,971 A | 11/1992 | Koshizawa |
| 5,172,206 A | 12/1992 | Iizuka |
| 5,204,778 A | 4/1993 | Bechtel |
| 5,214,274 A | 5/1993 | Yang |
| 5,214,275 A | 5/1993 | Freeman et al. |
| 5,220,317 A | 6/1993 | Lynam et al. |
| 5,235,178 A | 8/1993 | Hegyi |
| 5,243,215 A | 9/1993 | Enomoto et al. |
| 5,276,389 A | 1/1994 | Levers |
| 5,306,992 A | 4/1994 | Droge |
| 5,313,072 A | 5/1994 | Vachss |
| 5,329,206 A | 7/1994 | Slotkowski et al. |
| 5,336,980 A | 8/1994 | Levers |
| 5,338,691 A | 8/1994 | Enomoto et al. |
| 5,386,111 A | 1/1995 | Zimmerman |
| 5,386,128 A | 1/1995 | Fossum et al. |
| 5,400,072 A | 3/1995 | Izumi et al. |
| 5,410,455 A | 4/1995 | Hashimoto |
| 5,416,313 A | 5/1995 | Larson et al. |
| 5,416,318 A | 5/1995 | Hegyi |
| 5,426,294 A | 6/1995 | Kobayashi et al. |
| 5,434,407 A | 7/1995 | Bauer et al. |
| 5,451,822 A | 9/1995 | Bechtel et al. |
| 5,471,515 A | 11/1995 | Fossum |
| 5,483,346 A | 1/1996 | Butzer |
| 5,488,416 A | 1/1996 | Kyuma |
| 5,498,866 A | 3/1996 | Bendicks et al. |
| 5,508,592 A | 4/1996 | Lapatovich et al. |
| 5,526,190 A | 6/1996 | Hubble, III et al. |
| 5,537,003 A | 7/1996 | Bechtel et al. |
| 5,550,677 A | 8/1996 | Schofield et al. |
| 5,561,773 A | 10/1996 | Kalish et al. |
| 5,581,240 A | 12/1996 | Egger |
| 5,598,146 A | 1/1997 | Schroder |
| 5,602,384 A | 2/1997 | Nunogaki et al. |
| 5,614,788 A | 3/1997 | Mullins et al. |
| 5,625,210 A | 4/1997 | Lee et al. |
| 5,644,418 A | 7/1997 | Woodward |
| 5,650,643 A | 7/1997 | Konuma |
| 5,659,294 A | 8/1997 | Schroder |
| 5,659,423 A | 8/1997 | Schierbeek et al. |
| 5,660,454 A | 8/1997 | Mori et al. |
| 5,661,303 A | 8/1997 | Teder |
| 5,663,542 A | 9/1997 | Kohr et al. |
| 5,666,028 A | 9/1997 | Bechtel et al. |
| 5,666,037 A | 9/1997 | Reime |
| 5,675,438 A | 10/1997 | Nagao et al. |
| 5,703,568 A | 12/1997 | Hegyi |
| 5,712,685 A | 1/1998 | Dumas |
| 5,715,093 A | 2/1998 | Schierbeek et al. |
| 5,724,187 A | 3/1998 | Varaprasad et al. |
| RE35,762 E | 4/1998 | Zimmerman |
| 5,743,946 A | 4/1998 | Aoki et al. |
| 5,760,962 A * | 6/1998 | Schofield et al. ............. 359/604 |
| 5,789,737 A | 8/1998 | Street |
| 5,796,094 A | 8/1998 | Schofield et al. |
| 5,796,106 A | 8/1998 | Noack |
| 5,808,350 A | 9/1998 | Jack et al. |
| 5,811,793 A | 9/1998 | Pientka |
| 5,818,600 A | 10/1998 | Bendicks et al. |
| 5,821,863 A | 10/1998 | Schroder et al. |
| 5,837,994 A | 11/1998 | Stam et al. |
| 5,841,126 A | 11/1998 | Fossum et al. |
| 5,841,159 A | 11/1998 | Lee et al. |
| 5,841,177 A | 11/1998 | Komoto et al. |
| 5,869,883 A | 2/1999 | Mehringer et al. |
| 5,872,437 A | 2/1999 | Pientka et al. |
| 5,877,897 A | 3/1999 | Schofield et al. |
| 5,883,605 A | 3/1999 | Knapp |
| 5,904,493 A | 5/1999 | Lee et al. |
| 5,923,027 A | 7/1999 | Stam et al. |
| 5,942,853 A | 8/1999 | Piscart |
| 5,990,469 A | 11/1999 | Bechtel et al. |
| 6,008,486 A | 12/1999 | Stam et al. |
| 6,027,955 A | 2/2000 | Lee et al. |
| 6,037,824 A | 3/2000 | Takahashi |
| 6,069,378 A | 5/2000 | Toyoda et al. |
| 6,097,023 A | 8/2000 | Schofield et al. |
| 6,114,688 A | 9/2000 | Tanaka et al. |
| 6,169,295 B1 | 1/2001 | Koo |
| 6,196,688 B1 | 3/2001 | Caskey et al. |
| 6,313,457 B1 | 11/2001 | Bauer et al. |
| 6,320,182 B1 | 11/2001 | Hubble, III et al. |
| 6,323,487 B1 | 11/2001 | Wu |
| 6,359,274 B1 | 3/2002 | Nixon et al. |
| 6,376,824 B1 | 4/2002 | Michenfelder et al. |
| 6,379,013 B1 | 4/2002 | Bechtel et al. |
| 6,389,687 B1 | 5/2002 | Glenn et al. |
| 6,396,040 B1 | 5/2002 | Hill |
| 6,441,886 B2 | 8/2002 | Suzuki et al. |
| 6,504,142 B2 | 1/2003 | Nixon et al. |
| 6,521,916 B2 | 2/2003 | Roberts et al. |
| 6,547,404 B2 | 4/2003 | Schierbeek |
| 6,548,808 B2 | 4/2003 | Ozawa |
| 6,618,181 B2 | 9/2003 | Bauer et al. |
| 6,679,608 B2 | 1/2004 | Bechtel et al. |
| 6,831,268 B2 | 12/2004 | Bechtel et al. |
| 6,918,674 B2 | 7/2005 | Drummond et al. |
| 6,947,077 B1 | 9/2005 | Krymski |
| 7,342,707 B2 | 3/2008 | Roberts et al. |
| 7,361,875 B2 | 4/2008 | Bechtel et al. |
| 7,524,092 B2 | 4/2009 | Rodriguez Barros et al. |
| 7,543,946 B2 | 6/2009 | Ockerse et al. |

(56) References Cited

U.S. PATENT DOCUMENTS

| | | | |
|---|---|---|---|
| 7,855,755 | B2 | 12/2010 | Weller et al. |
| 8,339,526 | B2 | 12/2012 | Minikey, Jr. et al. |
| 2005/0002103 | A1* | 1/2005 | Bechtel et al. ............... 359/604 |

FOREIGN PATENT DOCUMENTS

| | | |
|---|---|---|
| EP | 0000653 | 2/1979 |
| EP | 0677731 | 11/2002 |
| FR | 2641237 | 7/1990 |
| FR | 2726144 | 4/1996 |
| GB | 2056059 | 3/1981 |
| GB | 2169861 | 7/1986 |
| GB | 2342502 | 4/2000 |
| JP | 5036790 | 11/1975 |
| JP | 59199347 | 11/1984 |
| JP | 61291241 | 12/1986 |
| JP | 0174413 | 3/1989 |
| JP | H1237232 | 9/1989 |
| JP | 05340816 | 12/1993 |
| JP | 08107235 | 4/1996 |
| JP | 8166221 | 6/1996 |
| JP | 9126998 | 5/1997 |
| JP | 09331075 | 12/1997 |
| JP | 11087785 | 3/1999 |
| JP | 2971750 | 8/1999 |
| JP | 2000031582 | 1/2000 |
| JP | 2000133821 | 5/2000 |
| JP | 2001077424 | 3/2001 |
| JP | 2002134794 | 5/2002 |
| WO | WO8605147 | 9/1986 |

OTHER PUBLICATIONS

Tohru Shimizu et al., "SAE Paper No. 980322, pp. 113-117.,", published 1998.

Christopher M. Kormanyos, "SAE Paper No. 980003, pp. 13-18.,", published 1998.

Franz-Josef Kalze, "SAE Paper No. 980005, pp. 23-26.,", published 1998.

J.P. Lowenau et al., "SAE Paper No. 980007, pp. 33-38.,", published 1998.

* cited by examiner

REARVIEW ASSEMBLY WITH MULTIPLE AMBIENT LIGHT SENSORS

CROSS-REFERENCE TO RELATED APPLICATIONS

This application claims the benefit of U.S. Provisional Application No. 61/501,024 filed on Jun. 24, 2011 by Barry K. Nelson et al. and entitled "REARVIEW ASSEMBLY WITH MULTIPLE AMBIENT LIGHT SENSORS," the entire disclosure of which is incorporated herein by reference.

FIELD OF THE INVENTION

The present invention generally relates to a rearview assembly, and more particularly, a rearview assembly with multiple generally forward facing ambient light sensors.

SUMMARY OF THE INVENTION

According to one aspect of the present invention, a rearview assembly is configured for use with a vehicle, the rearview assembly includes a first light sensor generally facing forward with respect to an forward driving orientation of the vehicle and configured to detect ambient light, a second light sensor generally facing forward with respect to a forward driving orientation of the vehicle and configured to detect ambient light, wherein the second light sensor is spaced apart at least about 10 cm from the first light sensor, a rearview component configured to display an image rearward of the vehicle, and a processor communicatively connected to the first light sensor, the second light sensor, and the rearview component, wherein the processor is configured to control the rearview component based upon light detected by at least one of the first and second light sensors.

According to another aspect of the present invention, a method of detecting ambient light with a plurality of light sensors includes the steps of detecting light by at least a first light sensor and a second light sensor, comparing an output of the first light sensor and the second light sensor, controlling a rearview component of a vehicle based upon light detected from the first light sensor if the first light sensor detected more light than the second light sensor, and controlling a rearview component based upon light detected from the second light sensor if the second light sensor detected more light than the first light sensor.

According to another aspect of the present invention, a rearview assembly is configured for use with a vehicle, the rearview assembly includes a housing; a rearview component mounted in the housing and configured to display an image rearward of the vehicle; a mounting mechanism for mounting the housing to the vehicle; a first light sensor generally facing forward with respect to a forward driving orientation of the vehicle and configured to detect ambient light, the first light sensor mounted in the housing on a first side of the mounting mechanism; a second light sensor generally facing forward with respect to a forward driving orientation of the vehicle and configured to detect ambient light, the second light sensor mounted in the housing on a second side of the mounting mechanism that is opposite the first side; and a processor communicatively connected to the first light sensor, the second light sensor, and the rearview component, wherein the processor is configured to control the rearview component based upon light detected by at least one of the first and second light sensors.

These and other features, advantages, and objects of the present invention will be further understood and appreciated by those skilled in the art by reference to the following specification, claims, and appended drawings.

BRIEF DESCRIPTION OF THE DRAWINGS

The present invention will become more fully understood from the detailed description and the accompanying drawings, wherein.

DETAILED DESCRIPTION

Figure 1:
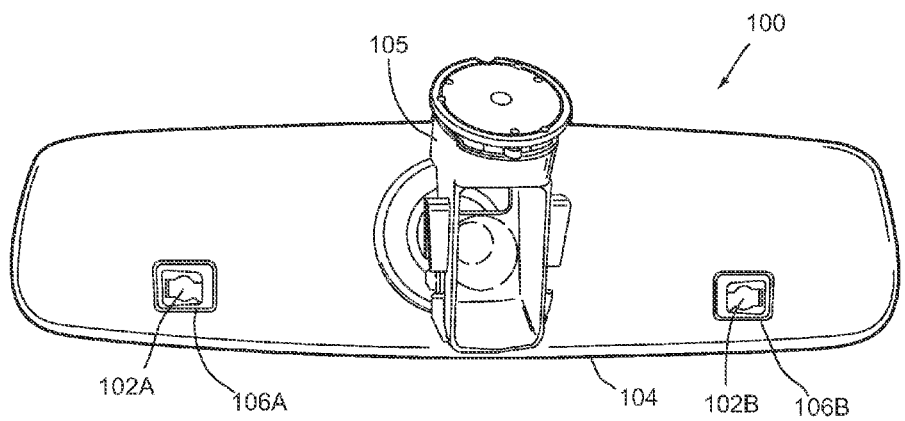
FIG. 1 is rear perspective view of a rearview assembly having multiple apertures for light sensors, in accordance with one embodiment of the present invention.
Figure 2:
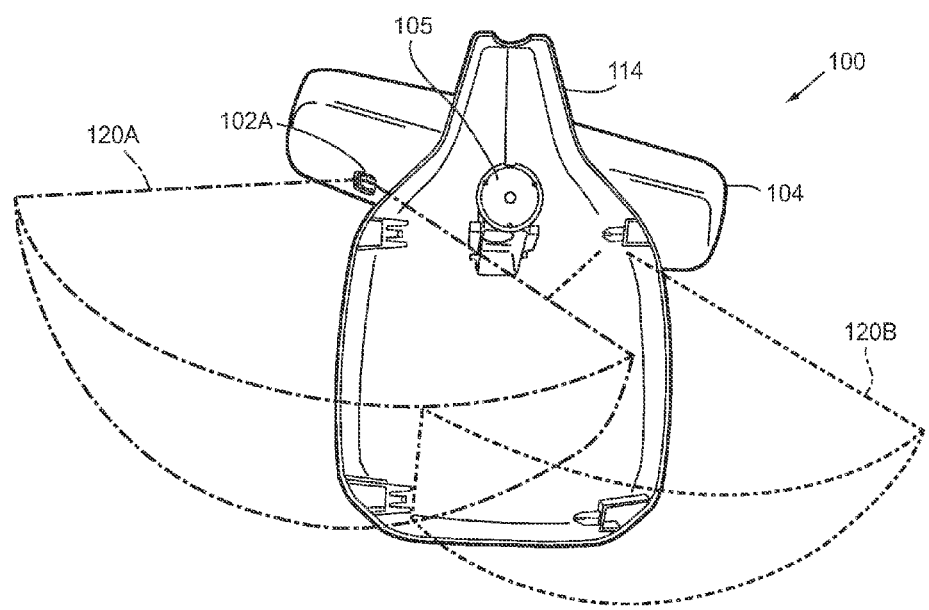
FIG. 2 is a top-rear perspective view of a rearview assembly illustrating a blockage of a left light sensor, in accordance with one embodiment of the present invention.
Figure 3:
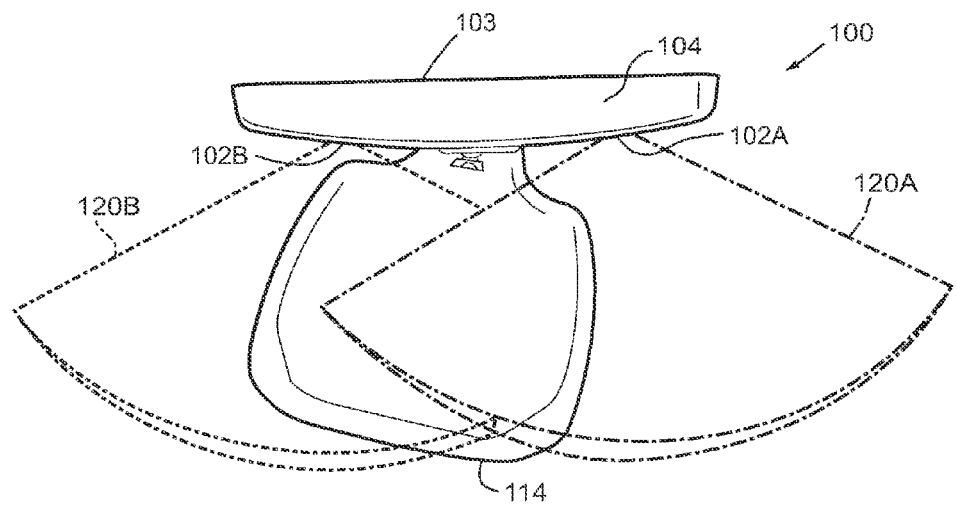
FIG. 3 is a bottom perspective view of the rearview assembly of FIG. 2.
Figure 4:
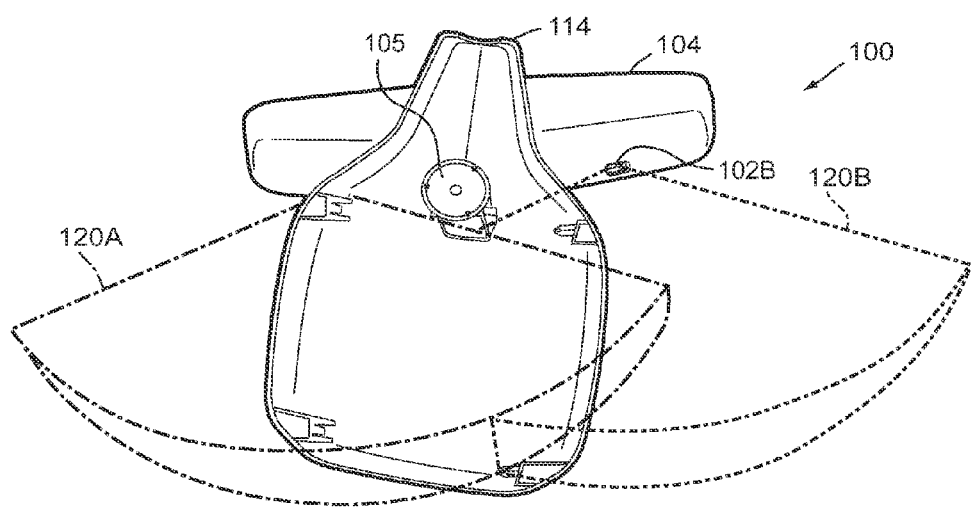
FIG. 4 is a top-rear perspective view of a rearview assembly illustrating a blockage of a right light sensor, in accordance with one embodiment of the present invention.
Figure 5:
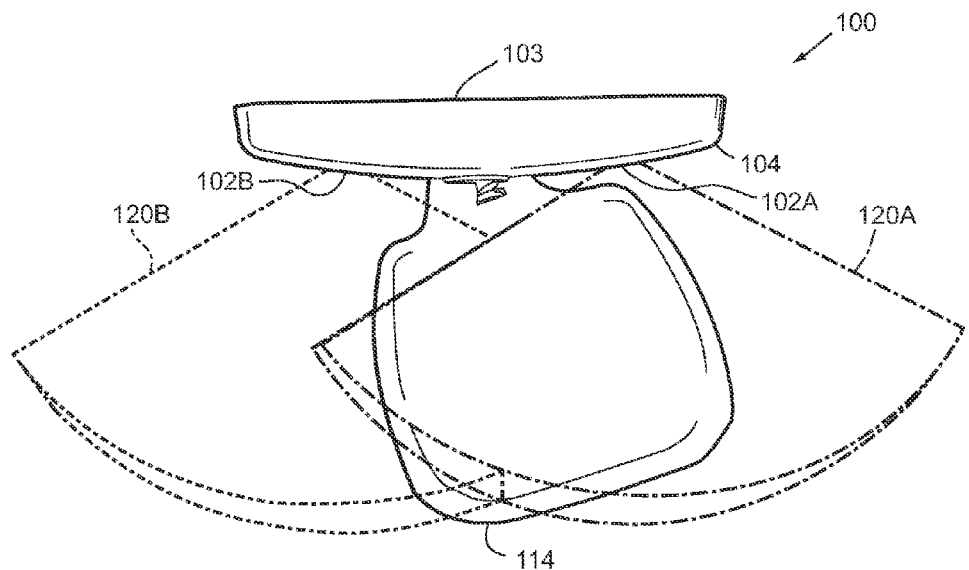
FIG. 5 is a bottom perspective view of the rearview assembly of FIG. 4.

The present illustrated embodiments reside primarily in combinations of method steps and apparatus components related to a rearview assembly having a plurality of ambient light sensors and a method of detecting ambient light using a plurality of ambient light sensors. Accordingly, the apparatus components and method steps have been represented, where appropriate, by conventional symbols in the drawings, showing only those specific details that are pertinent to understanding the embodiments of the present invention so as not to obscure the disclosure with details that will be readily apparent to those of ordinary skill in the art having the benefit of the description herein. Further, like numerals in the description and drawings represent like elements.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

In reference to FIGS. 1-5, a rearview assembly is generally shown at reference identifier 100. The rearview assembly 100 has a plurality of light sensors (e.g., ambient light sensors) that are generally facing forward with respect to a forward driving direction of a vehicle. The plurality of light sensors include at a first light sensor 102A and a second light sensor 102B (FIGS. 1-5). As illustrated in FIG. 1, the rearview assembly 100 includes a housing 104 that defines apertures 106A and 106B that are configured for ambient light to be received or detected by the light sensors 102A, 102B, respectively. The rearview assembly 100 may further include a mounting mechanism 105 for mounting the assembly to the vehicle. According to one embodiment, first light sensor 102A is mounted in housing 104 on a first side of mounting mechanism 105 and second light sensor 102B is mounted in housing 104 on a second side of mounting mechanism 105 that is opposite the first side, such that the first and second light sensors are mounted at opposite sides of the mounting mechanism. According to the same or another embodiment, the first and second light sensors are spaced at least about 10 cm (4 inches) apart from one another.

Figure 6:
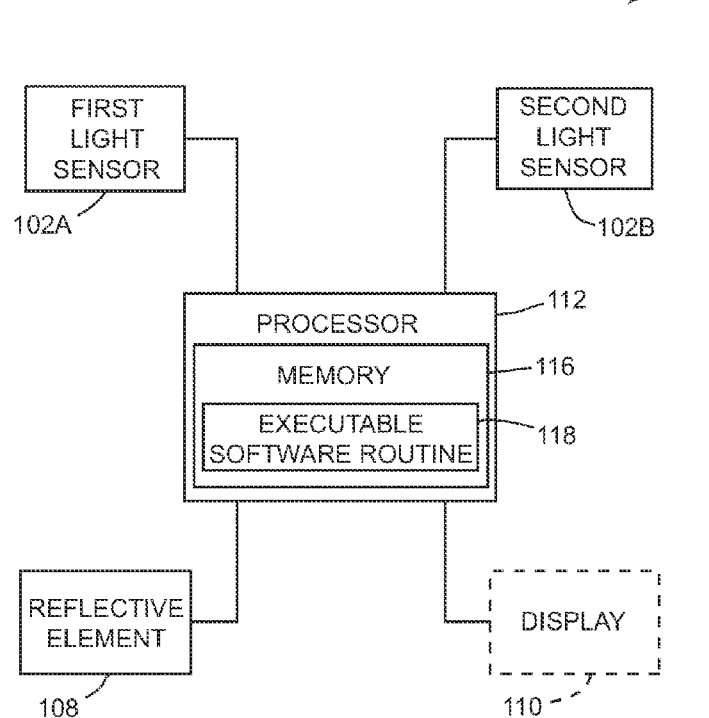
FIG. 6 is a block diagram of a rearview assembly, in accordance with one embodiment of the present invention.

The rearview assembly 100 can include a rearview component 103 configured to display an image rearward of the vehicle, such as, but not limited to, an automatically dimmable reflective element 108 (FIG. 6) (e.g., electrochromic mirror element, electro-optic mirror element) configured such that a reflectance state alters based upon detected ambient light; however, the rearview assembly 100 can also include non-mirror assemblies, such a rearview assembly 100 that includes a display 110 (shown in phantom in FIG. 6). Typically, a reflectance of the electro-optic element 108 and/or an intensity of the display 110 can be controlled based upon the ambient light detected by at least one of the plurality of light sensors, as described in greater detail herein.

With respect to FIG. 6, the rearview assembly 100 can include a processor 112 that is communicatively connected to the first light sensor 102A and the second light sensor 102B, such that the processor receives an output from the light sensors 102A, 102B that is representative of the amount of light detected by the light sensors 102A, 102B. According to one embodiment, the processor 112 determines which of the first and second light sensors 102A, 102B detected more light. The processor 110 can be communicatively connected to the electro-optic element 108, and configured to control the electro-optic element 108 based upon the output of the light sensors 102A, 102B that is detecting the greater amount of light. Thus, the processor uses the output of the light sensors 102A, 102B that is blocked the least. If the amount of light received by the light sensors 102A, 102B is equal, then the processor 112 can use either light sensors 102A, 102B to control the electro-optic element 108, but typically continues to use the light sensors 102A, 102B that was used after the previous interval.

The processor 112 can compare the outputs of the light sensors 102A, 102B at predetermined time intervals, such as, but not limited to, approximately 400 ms. However, it should be appreciated by those skilled in the art that: time intervals of different or varying lengths can be used; other operating characteristics of the rearview assembly 100 can prompt the processor to perform a comparison; operating characteristics of the vehicle can prompt the processor to perform a comparison; the like, or a combination thereof.

For purposes of explanation and not limitation, in operation, and as illustrated in FIGS. 2-5, the light sensors 102A, 102B can be blocked due to a secondary vehicle component 114 that is located between the rearview assembly 100 and a windshield of the vehicle. Such a secondary vehicle component 114 can be, but is not limited to, a rain sensor, an imager, the like, or a combination thereof. The amount of blockage caused by the secondary vehicle component 114 can be based upon an orientation of a light source (e.g., sun, street lamp, etc.) with respect to the rearview assembly 100 and/or an orientation of the rearview assembly 100 that is selected by a user (e.g., driver). Thus, depending upon the amount of tilt and rotation of the rearview assembly 100 with respect to one or more pivot points that can be based upon the height and/or seating position of the user can affect the amount of blockage caused by the secondary device 114 to the light sensors 102A, 102B. The seating position can include where within the seat a user is located, and a seating position within the vehicle (e.g., left side or right side of the vehicle).

Therefore, the rearview assembly 100 can be used in various environments under various conditions that include variable and/or continuous changes to the amount of blockage of the light sensors 102A, 102B and adequately control the dimming of the electro-optic element 108. It is undesirable if the reflective element is dimmed because the first light sensor 102A is substantially blocked by the secondary vehicle component 114, and thus, if the amount of light received by the second light sensor 102B is greater than the amount of light received by the first light sensor 102A, the processor 112 can control the electro-optic element 108 and/or display 110 based upon the second light sensor 102B.

According to an alternate embodiment, the amount of light detected by the plurality of light sensors is communicated to the processor 114, and the processor 114 is configured to control the electro-optic element 108 based upon the multiple inputs. Thus, the processor 114 can be configured to control the electro-optic element 108 as a function of inputs received from the first and second light sensors 102A, 102B instead of comparing the two inputs and controlling the electro-optic element 108 based upon the input of the light sensors 102A, 102B that is receiving the greater amount of light.

The processor 112 can include a memory 116 that is configured to store one or more executable software routines 118 that are executed by the processor 112 to process the inputs received from the plurality of light sensors. It should be appreciated by those skilled in the art that the memory 116 can be internal to the processor 112, external to the processor 112, or a combination thereof.

According to one embodiment, the light sensors 102A, 102B are generally facing forward, which can be an approximate direction with respect to a forward driving direction of the vehicle. Typically, the light sensors 102A, 102B have an approximately 40 degree field of view in both the horizontal and the vertical directions. However, it should be appreciated by those skilled in the art that the light sensors 102A, 102B can have a larger or smaller field of view. Examples of the field of views of the first and second light sensors 102A, 102B are illustrated in FIGS. 2-5 at reference identifier 120A, 120B, respectively.

Figure 7:
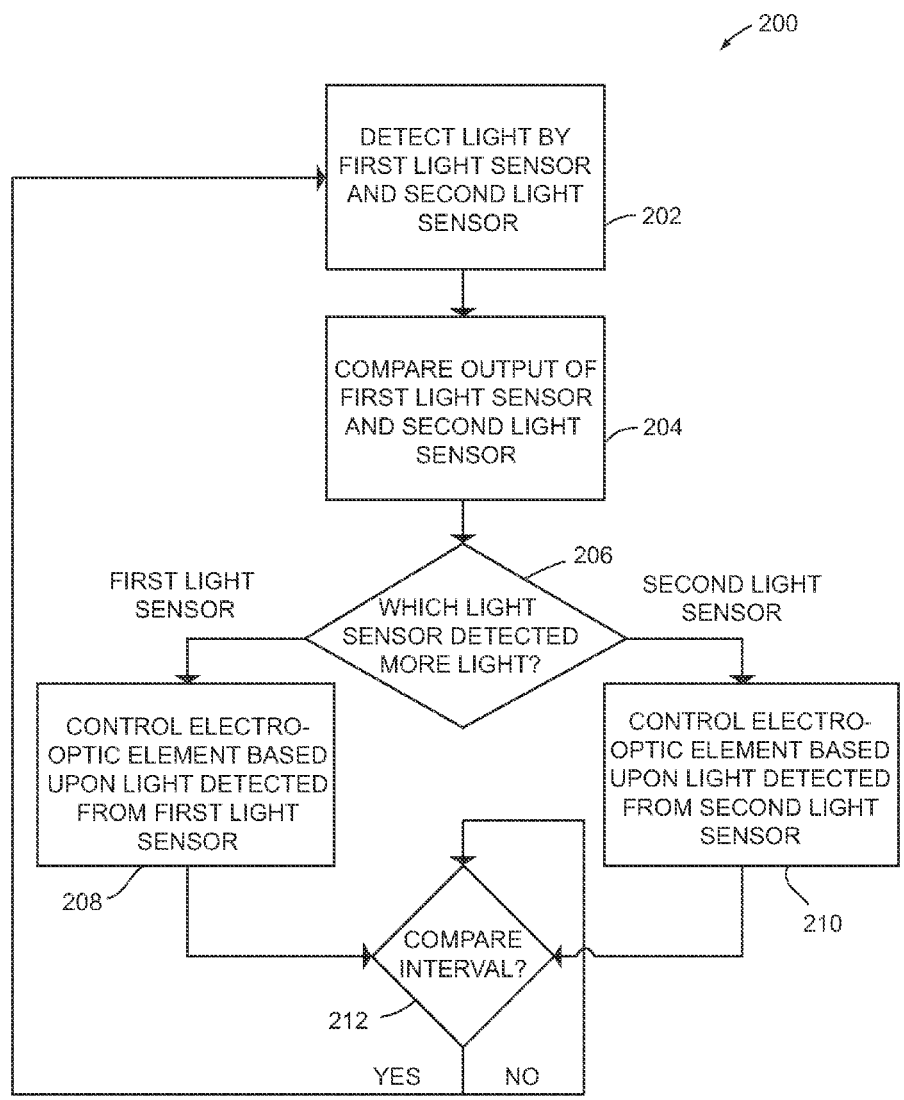
FIG. 7 is a flow chart illustrating a method of detecting ambient light with a plurality of light sensors, in accordance with one embodiment of the present invention.

With respect to FIGS. 1-7, a method of detecting ambient light with a plurality of light sensors is generally shown in FIG. 7 at reference identifier 200. The method 200 detects light by the first and second light sensors 102A, 102B (202), and compares the output (e.g., the amount of light detected) by the first and second light sensors 102A, 102B (204). The method 200 then determines which of the first and second light sensors detected more light (206). If it is determined that the first light sensor 102A detected more light (206), the method 200 controls the electro-optic element 108 based upon light detected from the first light sensor 102A (208). If it is determined that the second light sensor 102B received more light (206), the method 200 controls the electro-optic element 108 based upon light detected from the second light sensor 102B (210). Typically, the substantially same control algorithm is used to control the electro-optic element at 208 and 210, except that light reading from a different light sensor is used; however, it should be appreciated by those skilled in the art that 208 can use a different control algorithm than 210. For example, the electro-optic element 108 could be controlled based upon an average or weighted average of the light output of the first and second light sensors 102A, 102B.

The method 200 then determines if a compare interval has expired or been triggered (212), such as, but not limited to, a 400 ms period since comparing the outputs of the first and second light sensor 102A, 102B has expired. If the compare interval has not expired or been triggered (212), the method 200 returns to again determine if the compare interval has expired or been triggered (212). If the compare interval has expired or been triggered (212), the method 200 returns to detect light from the first and second light sensors 102A, 102B (202). The method 200 can continue to cycle so long as the rearview assembly 100 is being powered.

It should be appreciated by those skilled in the art that the description herein as to the plurality of light sensors being first and second light sensors 102A, 102B is for purposes of explanation and not limitation, such the more than two light sensors can be utilized in the rearview assembly 100. It should further be appreciated by those skilled in the art that dimensions or other numerical values and shapes described herein are approximations and are for purposes of explanation and not limitation, such that components can have other shapes or sizes.

Examples of light sensors are described in U.S. Provisional Application No. 61/515,389 filed on Aug. 5, 2011 by Richard T. Fish et al. and entitled "OPTICAL ASSEMBLY FOR LIGHT SENSOR," and in U.S. Pat. Nos. 6,870,656, entitled "ELECTROCHROMIC REARVIEW MIRROR ELEMENT INCORPORATING A THIRD SURFACE REFLECTOR," 6,313,457, entitled "MOISTURE DETECTING SYSTEM USING SEMICONDUCTOR LIGHT SENSOR WITH INTEGRAL CHARGE COLLECTION," 6,359,274, entitled, "PHOTODIODE LIGHT SENSOR," 6,504,142, entitled "PHOTODIODE LIGHT SENSOR," 6,402,328, entitled "AUTOMATIC DIMMING MIRROR USING SEMICONDUCTOR LIGHT SENSOR WITH INTEGRAL CHARGE COLLECTION," 6,379,013, entitled "VEHICLE EQUIPMENT CONTROL WITH SEMICONDUCTOR LIGHT SENSORS," 6,679,608, entitled "SENSOR DEVICE HAVING AN INTEGRAL ANAMORPHIC LENS," 6,831,268, entitled "SENSOR CONFIGURATION FOR SUBSTANTIAL SPACING FROM A SMALL APERTURE," 7,543,946, entitled "DIMMABLE REARVIEW ASSEMBLY HAVING A GLARE SENSOR," and 6,742,904, entitled "VEHICLE EQUIPMENT CONTROL WITH SEMICONDUCTOR LIGHT SENSORS," which are hereby incorporated herein by reference in their entireties.

Advantageously, the rearview assembly 100 and method 200 can adequately control the electro-optic element 108 when the secondary component 114 is between the rearview assembly 100 and the vehicle windshield by having a plurality of light sensors that can detect ambient light. It should be appreciated by those skilled in the art that the rearview assembly 100 and method 200 can have additional or alternative advantages. It should further be appreciated by those skilled in the art that the components or steps of the rearview assembly 100 and method 200, respectively, can be configured in additional or alternative combinations not explicitly described herein.

In addition to controlling reflectivity of an electro-optic element 108 and intensity of a display 110, processor 112 may also control exterior lights of the vehicle or other displays such as those in the instrument panel based on output from the first and second light sensors.

Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. A rearview assembly configured for use with a vehicle, the rearview assembly comprising:
  a first light sensor generally facing forward with respect to a forward driving orientation of the vehicle and configured to detect ambient light;
  a second light sensor generally facing forward with respect to a forward driving orientation of the vehicle and configured to detect ambient light, wherein said second light sensor is spaced apart at least about 10 cm from said first light sensor;
  a rearview component configured to display an image rearward of the vehicle; and
  a processor communicatively connected to said first light sensor, said second light sensor, and said rearview component, wherein said processor is configured to control said rearview component based upon light detected by at least one of said first and second light sensors.

2. The rearview assembly of claim 1, wherein said processor is configured to control said rearview component based upon light detected by said first light sensor if said first light sensor detects more light than said second light sensor.

3. The rearview assembly of claim 1, wherein said processor is configured to control said rearview component based upon light detected by said second light sensor if said second light sensor detects more light than said first light sensor.

4. The rearview assembly of claim 1, wherein said rearview component is an electro-optic reflective element.

5. The rearview assembly of claim 1, wherein said rearview component is a display, and wherein said processor controls a brightness of said display based upon light detected by at least one of said first and second light sensors.

6. The rearview assembly of claim 1, and further comprising:
  a housing; and
  a mounting mechanism for mounting said housing to the vehicle,
    wherein said rearview component is mounted in said housing, said first light sensor is mounted in said housing on a first side of said mounting mechanism, and said second light sensor is mounted in said housing on a second side of said mounting mechanism that is opposite said first side.

7. The rearview assembly of claim 1, wherein said processor is configured to control said rearview component based upon an average of light detected by said first and second light sensors.

8. A rearview assembly configured for use with a vehicle, the rearview assembly comprising:
  a housing;
  a rearview component mounted in said housing and configured to display an image rearward of the vehicle;
  a mounting mechanism for mounting said housing to the vehicle;
  a first light sensor generally facing forward with respect to a forward driving orientation of the vehicle and configured to detect ambient light, said first light sensor mounted in said housing on a first side of said mounting mechanism;
  a second light sensor generally facing forward with respect to a forward driving orientation of the vehicle and configured to detect ambient light, said second light sensor mounted in said housing on a second side of said mounting mechanism that is opposite said first side; and a processor communicatively connected to said first light sensor, said second light sensor, and said rearview component, wherein said processor is configured to control said rearview component based upon light detected by at least one of said first and second light sensors.

9. The rearview assembly of claim 8, wherein said processor is configured to control said rearview component based upon light detected by said first light sensor if said first light sensor detects more light than said second light sensor.

10. The rearview assembly of claim 8, wherein said processor is configured to control said rearview component based upon light detected by said second light sensor if said second light sensor detects more light than said first light sensor.

11. The rearview assembly of claim 8, wherein said rearview component is an electro-optic reflective element.

12. The rearview assembly of claim 8, wherein said rearview component is a display, and wherein said processor controls a brightness of said display based upon light detected by at least one of said first and second light sensors.

13. The rearview assembly of claim 8, wherein said second light sensor is spaced apart at least about 10 cm from said first light sensor.

14. The rearview assembly of claim 8, wherein said processor is configured to control said rearview component based upon an average of light detected by said first and second light sensors.

* * * * *